Aug. 23, 1955 — C. B. COX — 2,715,971
APPARATUS FOR HANDLING FREIGHT
Filed Aug. 27, 1951 — 7 Sheets-Sheet 1
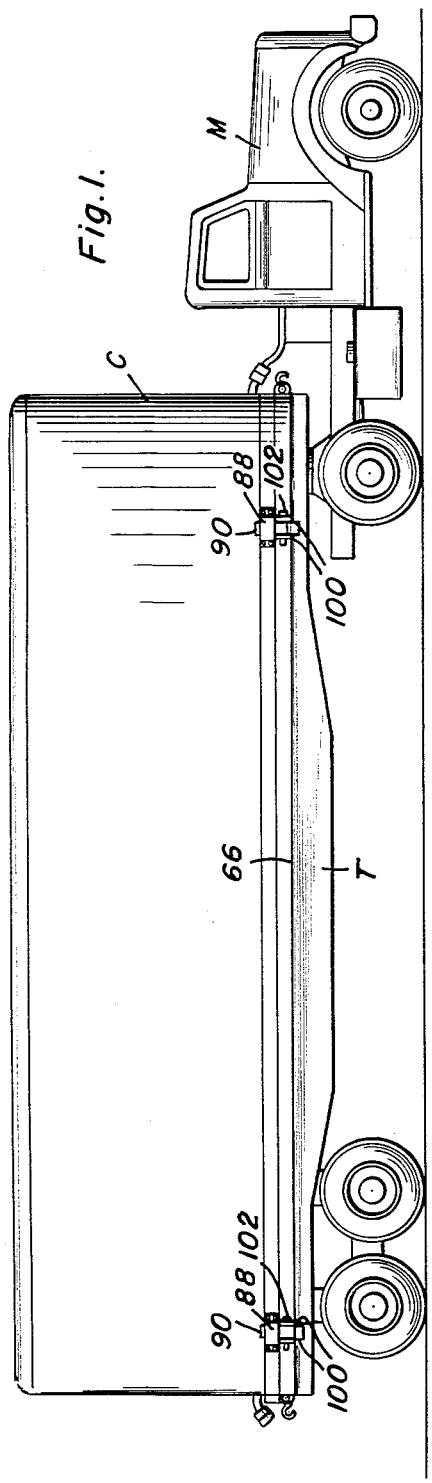
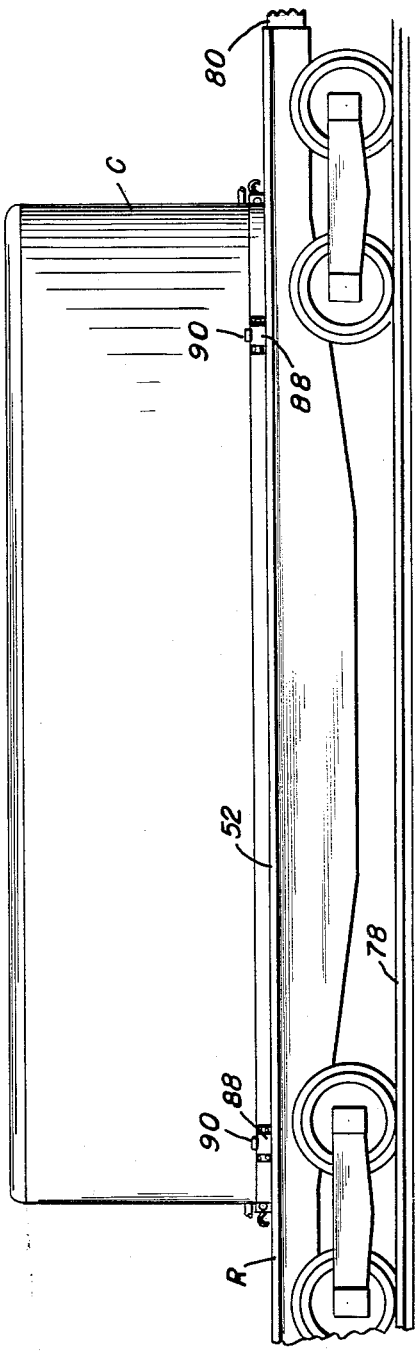
Charlie B. Cox
INVENTOR.
BY *Clarence A. O'Brien and Harvey B. Jackson*
Attorneys Aug. 23, 1955     C. B. COX     2,715,971
APPARATUS FOR HANDLING FREIGHT
Filed Aug. 27, 1951     7 Sheets-Sheet 2
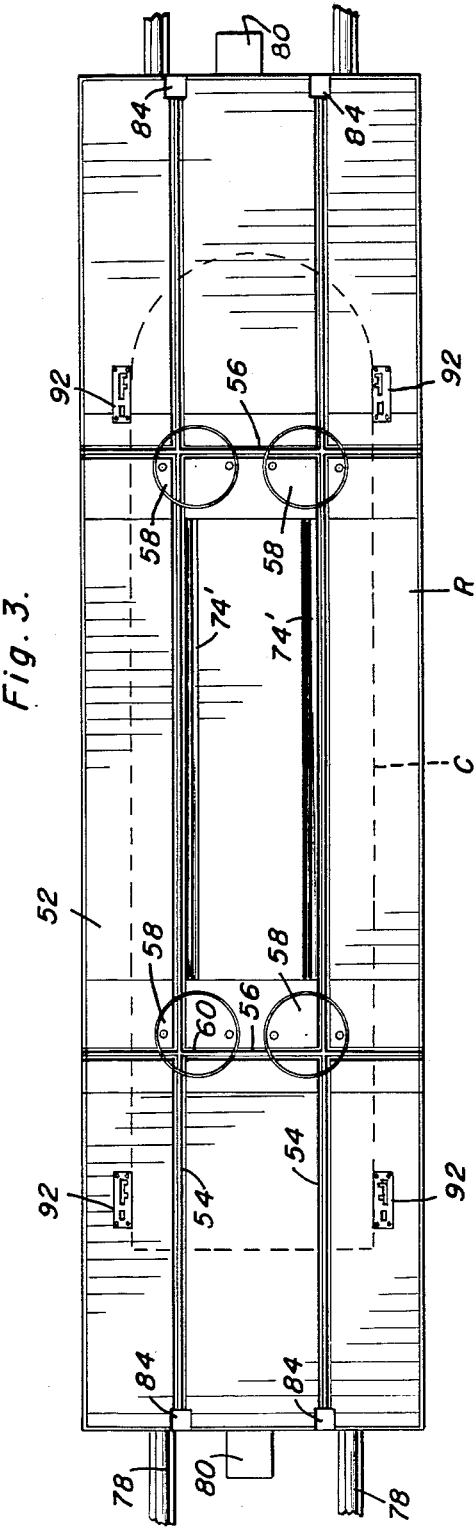
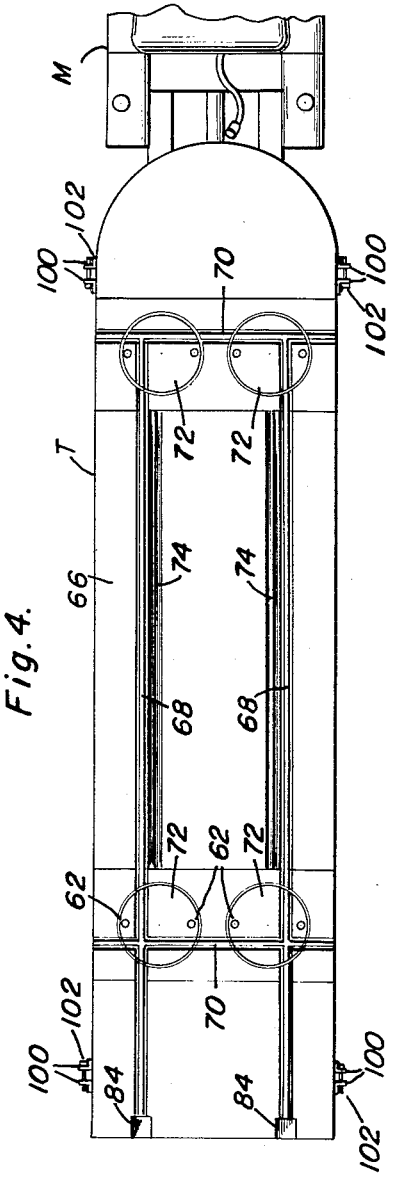
Charlie B. Cox
INVENTOR.

Aug. 23, 1955 C. B. COX 2,715,971
APPARATUS FOR HANDLING FREIGHT
Filed Aug. 27, 1951 7 Sheets-Sheet 3
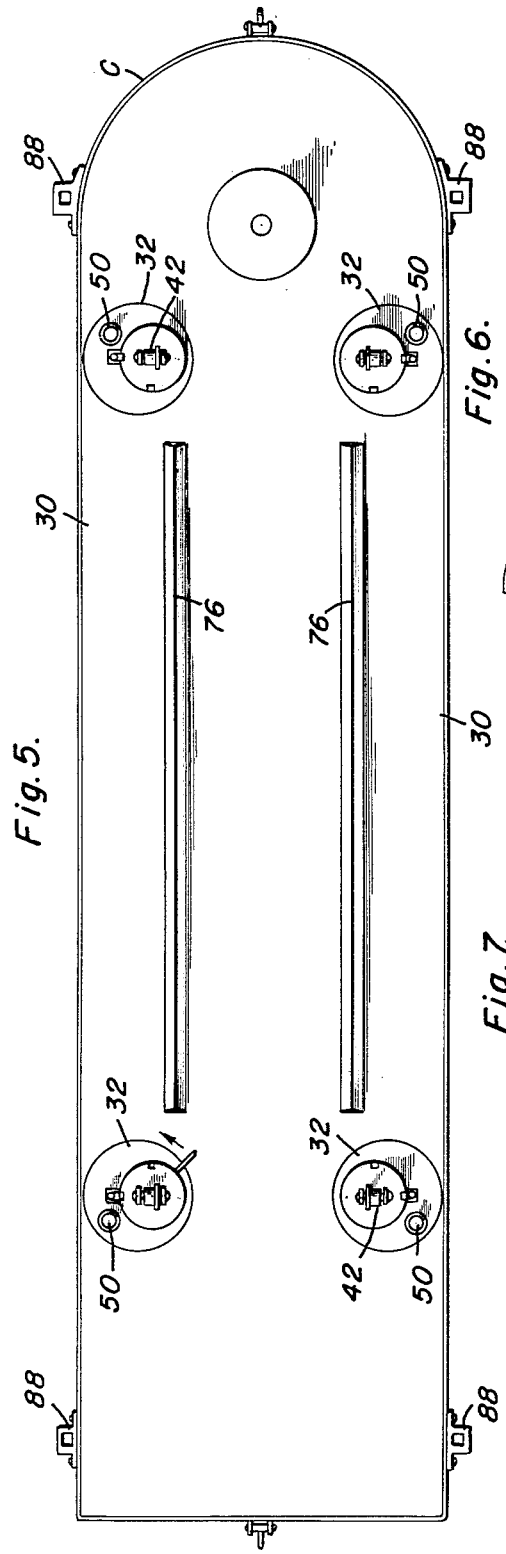
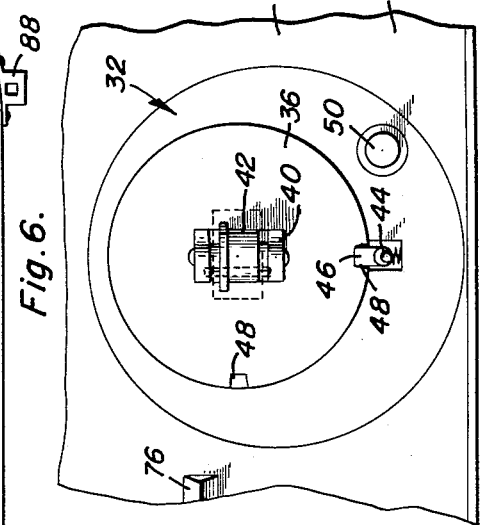
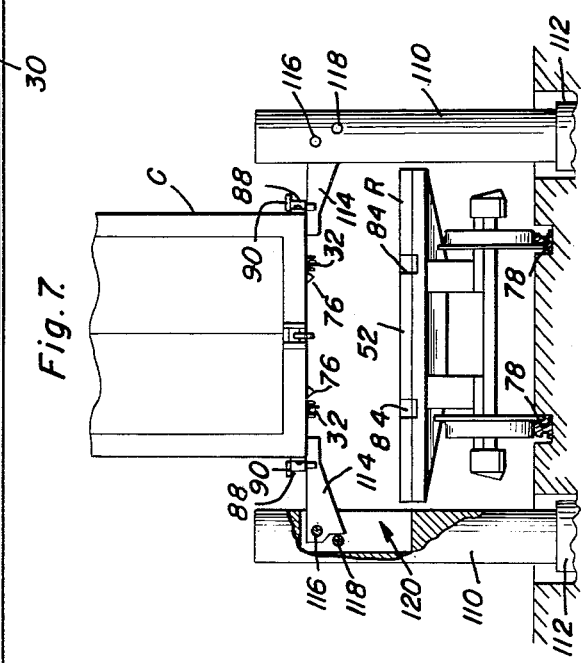
Charlie B. Cox
INVENTOR.
BY
*Attorneys*

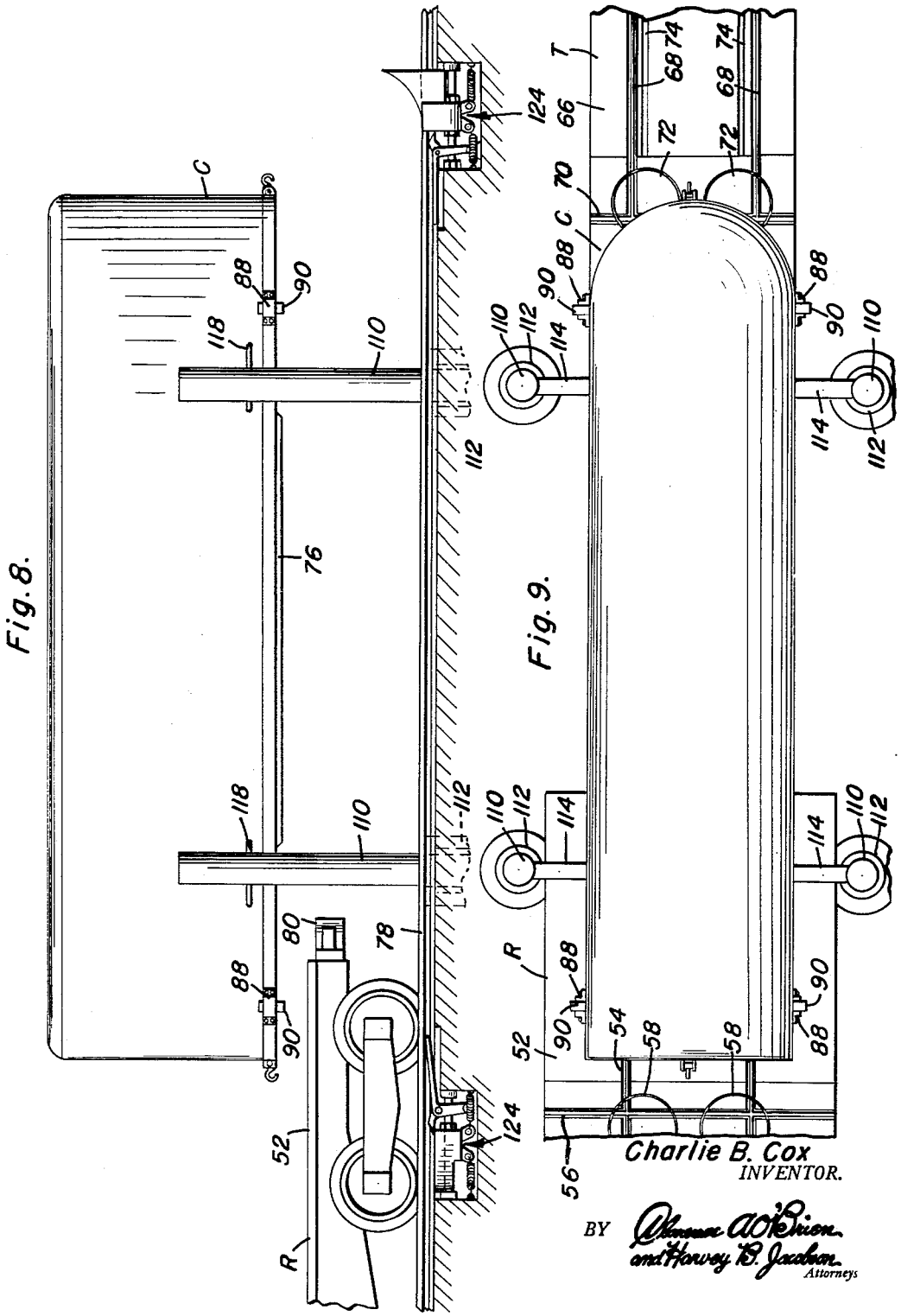

Aug. 23, 1955　　　C. B. COX　　　2,715,971
APPARATUS FOR HANDLING FREIGHT
Filed Aug. 27, 1951　　　7 Sheets-Sheet 5

Charlie B. Cox
INVENTOR.

BY
*Thomas A. O'Brien*
*and Harvey B. Jackson*
Attorneys

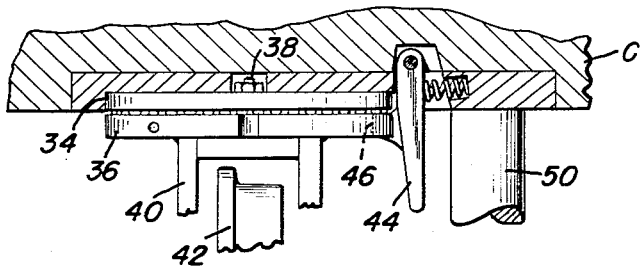
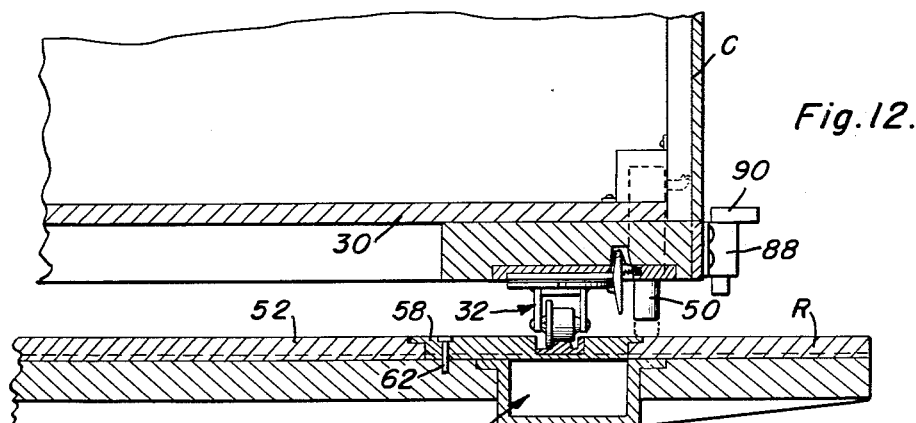
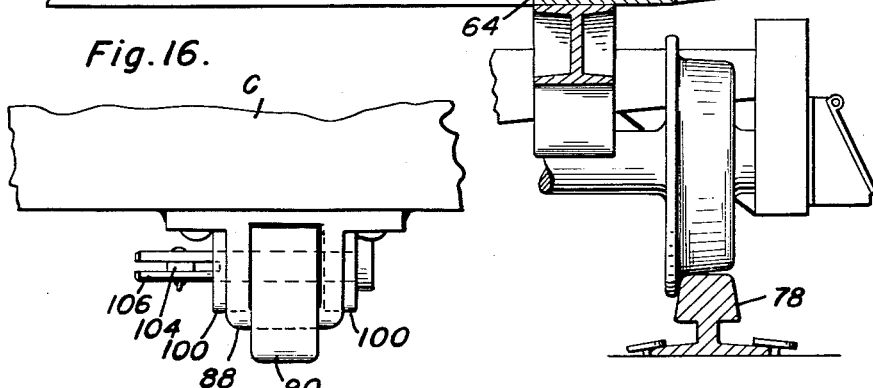
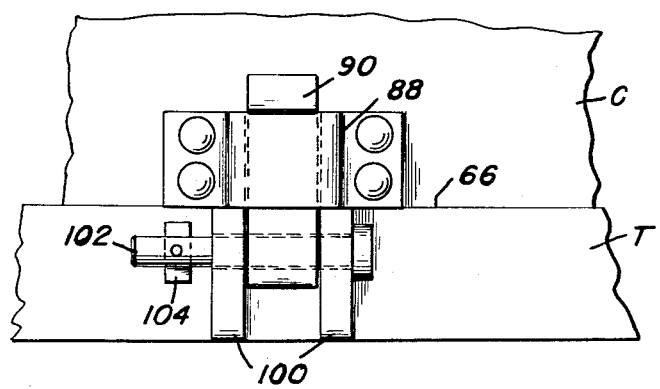

Aug. 23, 1955 C. B. COX 2,715,971
APPARATUS FOR HANDLING FREIGHT
Filed Aug. 27, 1951 7 Sheets-Sheet 7
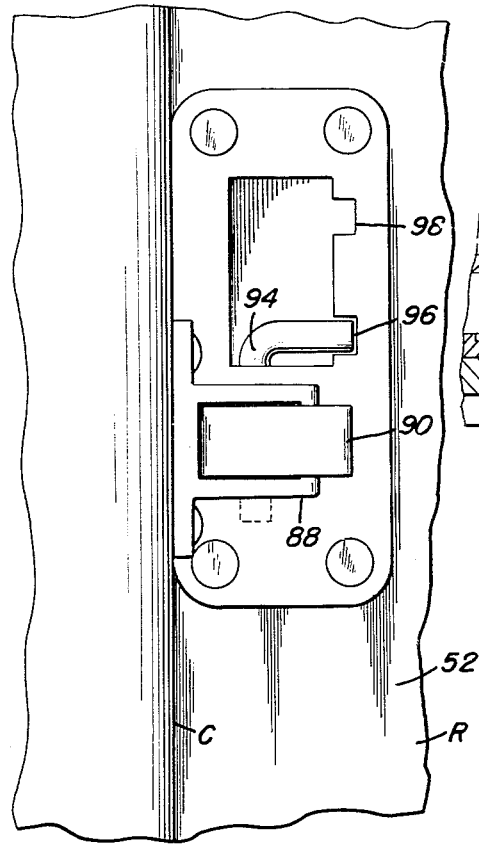
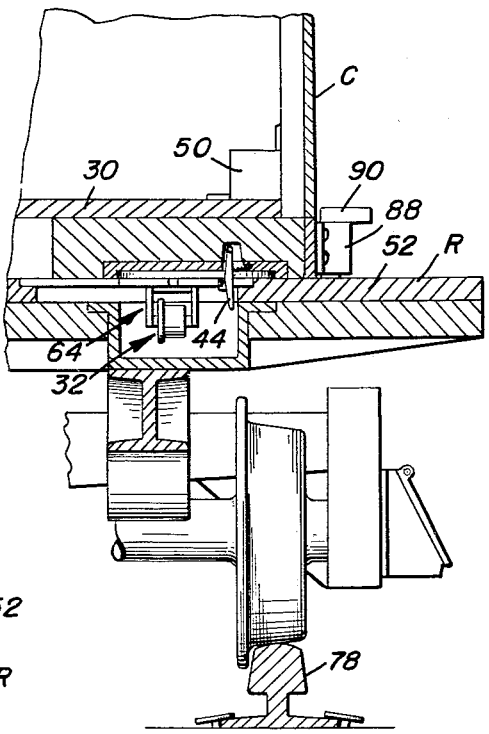
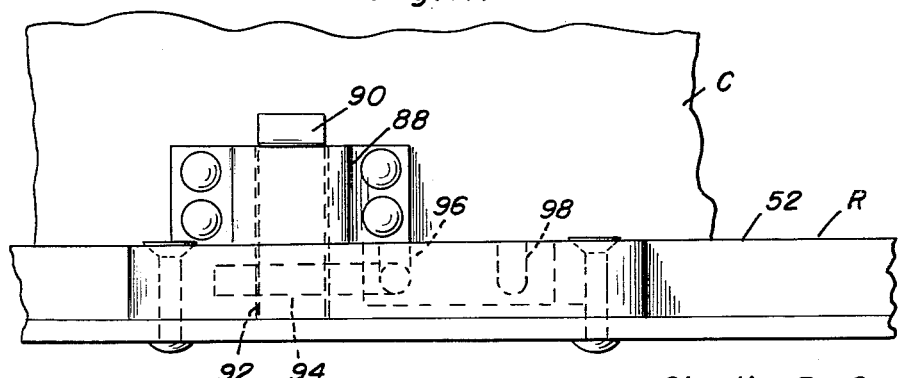
Charlie B. Cox
INVENTOR.

United States Patent Office 2,715,971
Patented Aug. 23, 1955

2,715,971

APPARATUS FOR HANDLING FREIGHT

Charlie B. Cox, Tesnus, Tex.

Application August 27, 1951, Serial No. 243,846

11 Claims. (Cl. 214—38)

This invention relates to new and useful improvements and structural refinements in the art of handling freight, and the principal object of the invention is to substantially expedite and greatly facilitate the handling of freight, particularly the transposition thereof from one vehicle or conveyance to another.

Specifically, the invention concerns itself with that aspect of freight handling which is usually encountered at railroad terminals where material is to be transposed, for example, from a railroad car to a truck, or vice versa, the conventional procedure being to first unload the freight material from vehicle and then load it into another, while in many instances an intermediate stage is encountered wherein the unloaded material must be temporarily stored in some location before it can be reloaded.

The instant invention seeks to eliminate the loss of time and effort which is incident to the successive loading, storing and unloading operations, this being accomplished by the provision of an apparatus whereby the freight material is loaded into a carrier and the carrier as a whole, with the freight therein, is conveniently shifted from one vehicle to another, as required.

An important feature of the invention, therefore, resides in the provision of the freight carrier and means for shifting the carrier selectively from one vehicle to another, while another important feature of the invention involves provision of means for securely anchoring the carrier to the vehicle for purposes of shipment.

Another feature of the invention involves the provision of means for temporarily supporting the carrier, either empty or loaded, in an elevated position while one vehicle is shifted from thereunder and another vehicle is shifted into position under the same, this arrangement permitting highly expeditious substitution of vehicles while the freight carrier itself remains relatively stationary.

While it is noted that the invention is primarily adapted for use at that particular state of the freight handling procedure where the cargo is shifted from a railroad car to a truck, and vice versa, it should be pointed out that the teachings of the invention may be equally applied to other environments such as for example, for transposing the freight from one truck to another, or from one freight car to another, or from a truck or a freight car to a stationary platform.

In addition to the provision of novel apparatus for freight handling, the invention also contemplates a new method for use in the freight handling procedure, as will be readily apparent from the disclosure which is to follow.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the freight carrier in position on a truck;

Figure 2 is a side elevational view of the freight carrier positioned on a railroad car.

Figure 3 is a top plan view of the railroad car with the freight carrier removed;

Figure 4 is a top plan view of the truck with the freight carrier removed;

Figure 5 is an underside plan view of the freight carrier per se;

Figure 6 is a fragmentary underside plan view of the carrier shown in Figure 5 and illustrating one of the castor units on an enlarged scale;

Figure 7 is an end elevational view illustrating the means for supporting the carrier in an elevated position while a vehicle is being shifted thereunder;

Figure 8 is a side elevational view of the apparatus shown in Figure 7;

Figure 9 is a top plan view of the apparatus shown in Figures 7 and 8;

Figure 12 is a fragmentary vertical sectional view illustrating one of the castor units used for shifting the carrier on the vehicle;

Figure 13 is a fragmentary sectional view, similar to that shown in Figure 12, but illustrating the carrier secured or anchored to the vehicle;

Figure 14 is a fragmentary sectional detail, partly in elevation, of one of the castor units;

Figure 15 is a top plan view of one of the anchoring units for securing the carrier to a truck;

Figure 16 is a top plan view of the unit shown in Figure 15;

Figure 17 is a side elevational view of one of the anchoring units used for securing the carrier to a railroad car; and Figure 18 is a top plan view of the unit shown in Figure 17.

Like characters of reference are employed to designate like parts in the specification and throughout the several views.

Figure 10:
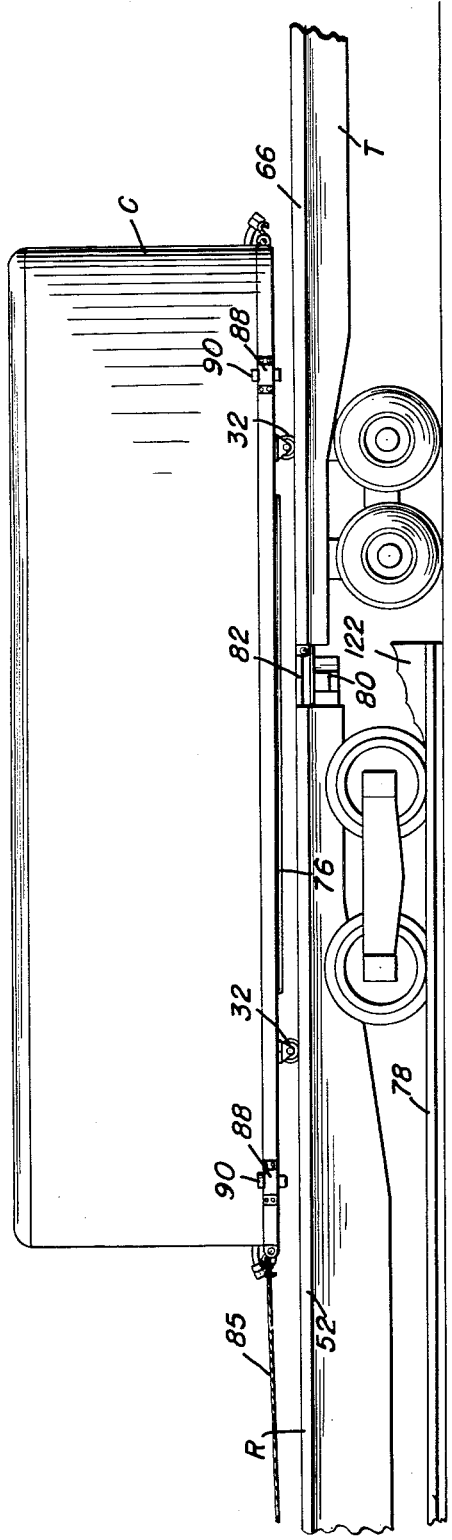
Figure 10 is a side elevational view illustrating a modified arrangement for shifting the carrier from one vehicle to another.
Figure 11:
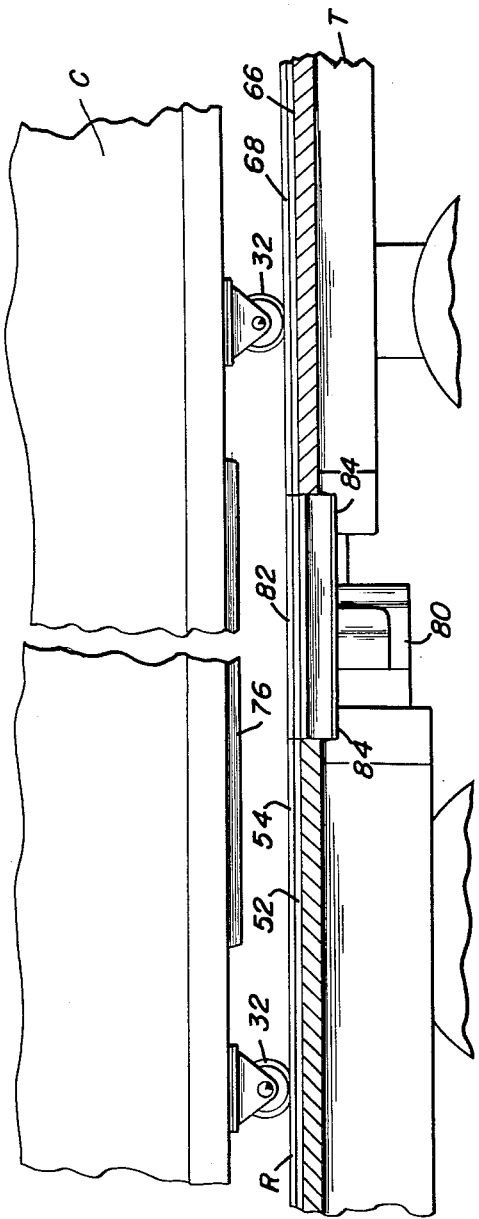
Figure 11 is a fragmentary elevational view on an enlarged scale of the apparatus shown in Figure 10, parts of the vehicle being broken away to illustrate the track connection therebetween.

Referring now to the accompanying drawings in detail, the reference character C designates generally a freight carrier which is in the form of a hollow body and which is adapted for selective positioning upon a plurality of vehicles, such as for example, a flat top railroad car R and a flat trailer T of the usual type, drawn by a tractor M.

The structural arrangement of the carrier C will first be described, the same having a bottom 30 provided with a plurality of castor units 32. These castor units are identical in construction, so that a description of one will suffice for all.

Each of the castor units 32 comprises a stationary ball race 34 and a rotatable ball race 36, the former being suitably secured to the bottom of the carrier while the latter is pivotally connected to the stationary rest by a fulcrum element 38 (see Figure 14). The rotatable race 36 carries a U-shaped yoke 40 in which is rotatably mounted a castor wheel 42, it being apparent that the yoke and castor wheel may be swung about a vertical axis, namely, the axis of the fulcrum element 38. However, means are provided for locking the castor against rotation, these means consisting of a spring pressed lever 44 which is pivotally connected to the bottom of the carrier C and is provided with a locking dog 46, selectively receivable in recesses 48 provided in the race 36 and spaced at 90° relative to each other. By virtue of this arrangement the castor unit may be locked in a position wherein the axis of rotation of the wheel 42 is either parallel or transverse to the longitudinal axis of the carrier, as will be clearly understood.

It may also be explained at this point that the bottom of the carrier C is provided with a plurality of downwardly projectible jacks 50 which are disposed immediately adjacent the respective castor units 32 and are preferably of a pneumatic or a hydraulic type and receive their supply of hydraulic fluid or compressed air from any suitable source (not shown), such as for example the compressed air line of the railroad car on which the carrier is positioned, or the tractor M of the trailer T, as the case may be.

The jacks 50 may be projected downwardly from the bottom of the carrier so that the carrier bottom is elevated relative to any supporting surface on which it may rest.

Reference will now be drawn to the railroad car R which is of the "flat" variety and includes a flat platform 52, provided in the upper surface thereof with sets of longitudinally extending and transversely extending tracks 54 and 56, respectively. These sets of tracks intersect each other at right angles and the platform 52 is provided at the points of intersection of the tracks with removable, circular plates 58 having track sections 60 provided therein, the track sections being adapted for alignment with the tracks 54 and 56, the plates 58 being secured to the platform 52 by suitable screws 62 (see Figure 12). The plates 58 constitute closures for recesses or wells 64 provided in the platform 52 to accommodate the respective castor units when the carrier 30 is positioned flatly on the top surface of the platform. This is illustrated in the accompanying Figure 13 and will be hereinafter more fully described.

Referring now to the structure of the trailer T, the same includes a flat platform 66 which, like the platform 52 of the railroad car, is provided with intersecting, longitudinal and transverse tracks, 60 and 70, respectively, and with removable closure plates 72 for the wells or recesses corresponding to the aforementioned recesses 64.

In addition, the upper surface of the platform 66 is provided with longitudinally extending grooves or channels 74 of V-shaped cross-section, while similar grooves or channels 74' are provided in the flat platform 52 of the railroad car, to accommodate downwardly projecting, complemental ribs 76, provided on the underside of the carrier C. In other words, when the carrier is positioned flatly on the upper surface of the platform of either the railroad car or the trailer, the ribs 76 are received in the grooves 74 or 74' as the case may be, so as to sustain the carrier against lateral displacement.

It may be also explained at this point that the transverse distance between the castor units 32 corresponds to the transverse spacing of the tracks 54 and 68, while the longitudinal distance between the castor units corresponds to the longitudinal spacing of the tracks 56 and 70. When the axis of the castor wheels 42 is transverse to the carrier C, the wheels may be engaged with the tracks 54 of the railroad car R or with the tracks 68 of the trailer T and similarly, when the axis of the castor wheels 42 is parallel to the longitudinal line of the carrier, the wheels may be engaged with either the tracks 56 of the car R or the tracks 70 of the trailer T. In this manner the carrier may be shifted either longitudinally or laterally on or off either vehicle, as required.

The rails 78 on which the railroad car R travels are preferably, although not necessarily disposed at ground level and since the platform of the railroad car and of the trailer are substantially of the same height, the trailer may be maneuvered into position either at the end or at the side of the railroad car and the carrier C shifted from one vehicle to another by virtue of the castor units 32 engaging the tracks in the respective vehicle platforms. When the carrier is to be shifted laterally, the longitudinal side edges of the railroad car and trailer may be brought into contiguous relation, but when the carrier is to be shifted longitudinally, allowance must be made for the usual couplers 80 which project from the ends of the railroad car. Thus, suitable track or rail sections 82 may be installed in suitable recesses 84 at the ends of the longitudinal tracks 54 and 68, so as to bridge the gap between the vehicles and facilitate passage of the castor unit 32 thereover.

The shifting of the carrier C from one vehicle to the other may be accomplished by any suitable means, such as for example, by a cable 85 which may be connected to the carrier and to the tractor M after the latter is disconnected from the trailer T.

Means are provided for anchoring or securing the carrier to the platform of the vehicle on which it is to be conveyed, these means involving the provision of substantially U-shaped brackets 88 which are secured to opposite sides of the lower portion of the carrier. These brackets are adapted to receive therein removable wedges 90 which project downwardly into suitable sockets 92 provided in the upper surface of the railroad car platform 52. Locking pins 94, slidable in the sockets 92, may be projected transversely through lower portions of the wedges 90 (see Figures 17 and 18), whereby to rigidly secure the carrier to the railroad car.

In the locked position thereof, the pins 94 have angulated portions which are engageable with keeper notches 96 provided in the sockets, while similar notches 98 are provided to accommodate the angulated portions of the pins in their unlocked positions.

When the carrier C is to be anchored to the platform 66 of the trailer T, the lower end portions of the wedges 90 are receivable between pairs of opposing brackets 100 which are secured to the side edges of the trailer platform and accommodate a removable keeper pin 102, the latter is provided with a swivel type keeper lug 104 so as to be sustained in position thereby in the bracket 100, the lug 104 being rotatably disposed in a slot 106 with which the keeper pin is formed (see Figures 15 and 16).

At this time it may be explained that when the carrier C is shifted from the platform of one vehicle to another by means of the castor units 32, it becomes necessary to lower the carrier into flat contacting relationship with the upper surface of the vehicle platform so that the anchoring means may be properly connected. This is achieved by actuating the aforementioned jacks 50 so as to project them downwardly from the carrier to engagement with the vehicle platform, whereby the entire carrier may be lifted to disengage the castor units 32 from the tracks in the vehicle platform. As soon as this is accomplished, the plates 58 or 72, as the case may be, may be readily removed from the platform and the jacks 50 retracted upwardly into the carrier, so that, in effect, the bottom of the carrier rests flatly on the upper surface of the platform while the castor units 32 are disposed in the recesses or wells 64. This procedure is clearly illustrated by the accompanying Figures 12 and 13.

The invention also contemplates the provision of alternative means for shifting the carrier from one vehicle to another, namely, a plurality of power actuated jack units 110 which are disposed at the opposite sides of the railroad tracks 78 and, when not required, may be fully retracted into the ground by any conventional pneumatic or hydraulic mechanism. The jacks 110 are not only retractable vertically, but are also rotatable about vertical axes in their actuating cylinders 112 (see Figure 7), and the jacks 110 are provided with laterally projectible support arms 114 which are pivotally mounted at 116 and are collapsibly sustained in their laterally extended position by transverse locking pins 118 with which the jacks are equipped. When this arrangement is placed in operation, the carrier C, located on the vehicle R, for example, is first raised upwardly to some extent by means of the jacks 50, whereupon the jacks 110 are actuated so that the support arms 114 underlie the bottom of the carrier and by lifting the jacks 110, the entire carrier C may be elevated above the vehicle R, as shown in Figure 7. Then, while the vehicle R is withdrawn from under the carrier, the vehicle T for example, may be simultaneously drawn under and the carrier subsequently lowered by means of the jacks 110 into position on the vehicle T, or vice versa, if the transfer is to be made from the vehicle T to the vehicle R. When the use of the jacks 110 is not required, they may be retracted into their cylinders 112 below the ground, which is accomplished by rotating the jacks 110 so as to shift the arms 114 outwardly, that is, away from the vehicle therebetween, and by simply removing the pins 118, the arms 114 may be collapsed into suitable recesses or pockets 120 in the jacks 110 and the latter may then be lowered into the cylinders 112.

If desired, suitable chocks may be employed on the railroad track 78 to prevent the railroad car from shifting while the carrier is being transferred, which chocks may be either of a stationary type as illustrated at 122 in Figure 10 or of a retractable type as illustrated at 124 in Figure 8. The chocks 124 are of any suitable construction and are adapted to lie flatly in the ground when they are not in use, so that they do not interfere with the passage of wheels thereover.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In an apparatus for handling freight, the combination of a vehicle having a platform provided with a set of tracks and with recesses intermediate the ends of said tracks, removable cover plates for said recesses having tack sections formed therein in continuous alignment with the tracks in the platform, a portable carrier removably positioned on said platform, wheels provided at the bottom of the carrier and engageable with said tracks, said wheels being receivable in said recesses when said cover plates are removed, and jack means between the carrier and the platform for raising the former above the latter to permit removal or replacement of said cover plates.

2. The device of claim 1, wherein said jack means includes a jack carried by said carrier adjacent each of said wheels.

3. In an apparatus for handling freight, the combination of a vehicle having an elongated platform provided with sets of intersecting longitudinal and transverse tracks and with recesses at the intersections of said tracks, removable cover plates for said recesses having intersecting track sections formed therein in continuous alignment with the tracks in the platform, a portable elongated carrier removably positioned on said platform, casters provided at the bottom of the carrier and swingable about vertical axes to selectively engage the longitudinal and transverse tracks, said casters being receivable in said recesses when said cover plates are removed, and jack means between the carrier and the platform for raising the former above the latter to permit removal or replacement of said cover plates.

4. The device as defined in claim 3, together with coacting means on said carrier and on said platform for anchoring the former to the latter when said casters are disposed in said recesses.

5. The device as defined in claim 3, including means for locking said casters against swivelling movement.

6. The device as defined in claim 3, wherein said jack means are carried by the underside of said carrier adjacent said casters.

7. The device of claim 3, wherein said casters are secured to said carrier by mounting plates, means for locking said casters against swivelling movement carried by said plates, said jack means including a jack carried by each of said plates.

8. In an apparatus for handling freight, the combination of a vehicle having a platform provided with sets of intersecting longitudinal and transverse tracks and with recesses at the intersections of said tracks, removable cover plates for said recesses having intersecting track sections formed therein for continuous alignment with the tracks in said platform, a portable carrier removably positioned on said platform, supporting wheels on said carrier for selectively engaging said sets of tracks, said supporting wheels being receivable in said recesses when said cover plates are removed, jack means for elevating said carrier to permit removal or replacement of said cover plates.

9. In an apparatus for handling freight, the combination of a vehicle having a platform provided with sets of intersecting longitudinal and transverse tracks and with recesses at the intersections of said tracks, removable cover plates for said recesses having intersecting track sections formed therein for continuous alignment with the tracks in said platform, a portable carrier removably positioned on said platform, supporting wheels on said carrier for selectively engaging said sets of tracks, said supporting wheels being receivable in said recesses when said cover plates are removed, jack means for elevating said carrier to permit removal or replacement of said cover plates, said jack means being carried by said carrier and adapted to engage said platform.

10. In an apparatus for handling freight, the combination of a vehicle having a platform provided with sets of intersecting longitudinal and transverse tracks and with recesses at the intersections of said tracks, removable cover plates for said recesses having intersecting track sections formed therein for continuous alignment with the tracks in said platform, a portable carrier removably positioned on said platform, supporting wheels on said carrier for selectively engaging said sets of tracks, said supporting wheels being receivable in said recesses when said cover plates are removed, jack means for elevating said carrier to permit removal or replacement of said cover plates, said jack means being carried by mounting plates for said supporting wheels.

11. In an apparatus for handling freight, the combination of a vehicle having a platform provided with sets of intersecting longitudinal and transverse tracks and with recesses at the intersections of said tracks, removable cover plates for said recesses having intersecting track sections formed therein for continuous alignment with the tracks in said platform, a portable carrier removably positioned on said platform, supporting wheels on said carrier for selectively engaging said sets of tracks, said supporting wheels being receivable in said recesses when said cover plates are removed, jack means for elevating said carrier to permit removal or replacement of said cover plates, elongated ribs on the bottom of said carrier receivable in complementary recesses in said platform to facilitate retaining of said carrier in position on said platform.

References Cited in the file of this patent

UNITED STATES PATENTS

| | | |
|---|---|---|
| 1,225,644 | Kandlbinder | May 8, 1917 |
| 1,512,281 | Fisher | Oct. 21, 1924 |
| 1,921,605 | Canfield | Aug. 8, 1933 |
| 1,944,771 | Webb et al. | Jan. 23, 1934 |
| 1,993,481 | Kellett | Mar. 5, 1935 |
| 2,033,119 | Bennett | Mar. 10, 1936 |
| 2,069,236 | Fitch | Feb. 2, 1937 |
| 2,447,559 | Bloemers | Aug. 24, 1948 |
| 2,489,024 | Gaynor | Nov. 22, 1949 |
| 2,605,007 | Gaynor | July 29, 1952 |